United States Patent
Cochran et al.

(10) Patent No.: US 7,220,506 B2
(45) Date of Patent: May 22, 2007

(54) HYBRID MONOLITHIC FUEL CELL

(75) Inventors: Joe K. Cochran, Marietta, GA (US);
Kon Jiun Lee, Norcross, GA (US);
Meilin Liu, Norcross, GA (US);
William L. Rauch, Marietta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 528 days.

(21) Appl. No.: 10/250,466

(22) PCT Filed: Jan. 4, 2002

(86) PCT No.: PCT/US02/00145

§ 371 (c)(1),
(2), (4) Date: Jul. 2, 2003

(87) PCT Pub. No.: WO03/005462

PCT Pub. Date: Jan. 16, 2003

(65) Prior Publication Data

US 2004/0072054 A1    Apr. 15, 2004

Related U.S. Application Data

(60) Provisional application No. 60/259,831, filed on Jan. 5, 2001.

(51) Int. Cl.
*H01M 8/10* (2006.01)

(52) U.S. Cl. .................. 429/30; 429/32; 429/40; 429/44

(58) Field of Classification Search ............. 429/12–46
See application file for complete search history.

(56) References Cited

U.S. PATENT DOCUMENTS

| | | | | |
|---|---|---|---|---|
| 5,034,023 | A * | 7/1991 | Thompson | 205/634 |
| 5,205,990 | A * | 4/1993 | Lawless | 422/121 |
| 6,025,084 | A * | 2/2000 | Kawasaki et al. | 429/30 |
| 6,372,375 | B1 * | 4/2002 | Lawless | 429/40 |
| 6,551,734 | B1 * | 4/2003 | Simpkins et al. | 429/26 |
| 6,551,735 | B2 * | 4/2003 | Badding et al. | 429/31 |
| 6,946,213 | B2 * | 9/2005 | Seabaugh et al. | 429/40 |

* cited by examiner

*Primary Examiner*—Susy Tsang-Foster
*Assistant Examiner*—Alix Echelmeyer
(74) *Attorney, Agent, or Firm*—Thomas, Kayden, Horstemeyer & Risley, LLP (57) ABSTRACT

The present disclosure relates to hybrid monolithic fuel cells. In one embodiment, the fuel cells comprise a monolithic substrate composed of a metal material and an electrolyte material, the substrate defining a fuel channel and an oxidant channel that are separated by the electrolyte material. The disclosure also relates to methods for manufacturing hybrid monolithic fuel cells. In one embodiment, the methods comprise preparing a metal material, preparing an electrolyte material, and forming a hybrid monolithic fuel cell substrate comprising the metal and electrolyte materials in a one-step fabrication process.

16 Claims, 11 Drawing Sheets

FIG. 1

(PRIOR ART)

HYBRID MONOLITHIC FUEL CELL

CROSS-REFERENCE TO RELATED APPLICATION

The present application claims the benefit of the filing date of U.S. Provisional Application Ser. No. 60/259,831, filed Jan. 5, 2001, which is hereby incorporated by reference in its entirety into the present disclosure.

STATEMENT REGARDING FEDERALLY SPONSORED RESEARCH OR DEVELOPMENT

The U.S. Government may have a paid-up license in this invention, and may have the right in limited circumstances to require the patent owner to license to others on reasonable terms as provided for by the terms of Grant Nos. N00014-99-1-0852 and N00014-99-1-1016 awarded by the U.S. Navy.

FIELD OF THE INVENTION

The present disclosure relates to fuel cells and their manufacture. More particularly, the disclosure relates to solid oxide fuel cells having a monolithic metal-electrolyte substrates and methods for manufacturing the same.

BACKGROUND OF THE INVENTION

Currently, there is a great deal of interest in developing alternative energy sources. For instance, there is much interest in developing alternatives to conventional internal combustion engines found in most vehicles. One such alternative energy source being investigated is the fuel cell.

Generally speaking, fuel cells are electrochemical devices that, like conventional batteries, convert the chemical energy of a fuel directly into electrical energy. Unlike conventional batteries, however, fuel cells use externally supplied fuel, such as hydrocarbon fuels, to generate the electrical energy.

Many advantages can be attained through the use of fuel cells. For instance, fuel cells operate with high efficiency due to their ability to directly convert chemical energy to electrical energy. By contrast, internal combustion engines convert chemical energy to thermal energy and then to mechanical energy with substantial losses in accordance with the Carnot cycle. Another advantage provided by fuel cells is that, unlike internal combustion engines, fuel cells do not produce harmful pollutants during operation. Furthermore, fuel cells are low maintenance energy sources in that they require no moving parts beyond those used to deliver fuel to the cells. Additionally, unlike batteries, fuel cells do not deplete with use and therefore do not need frequent replacement or recharging. Many other such advantages exist including low noise production, low vibration, low thermal emissions, high reliability, modularity, fuel flexibility, etc.

Figure 1:
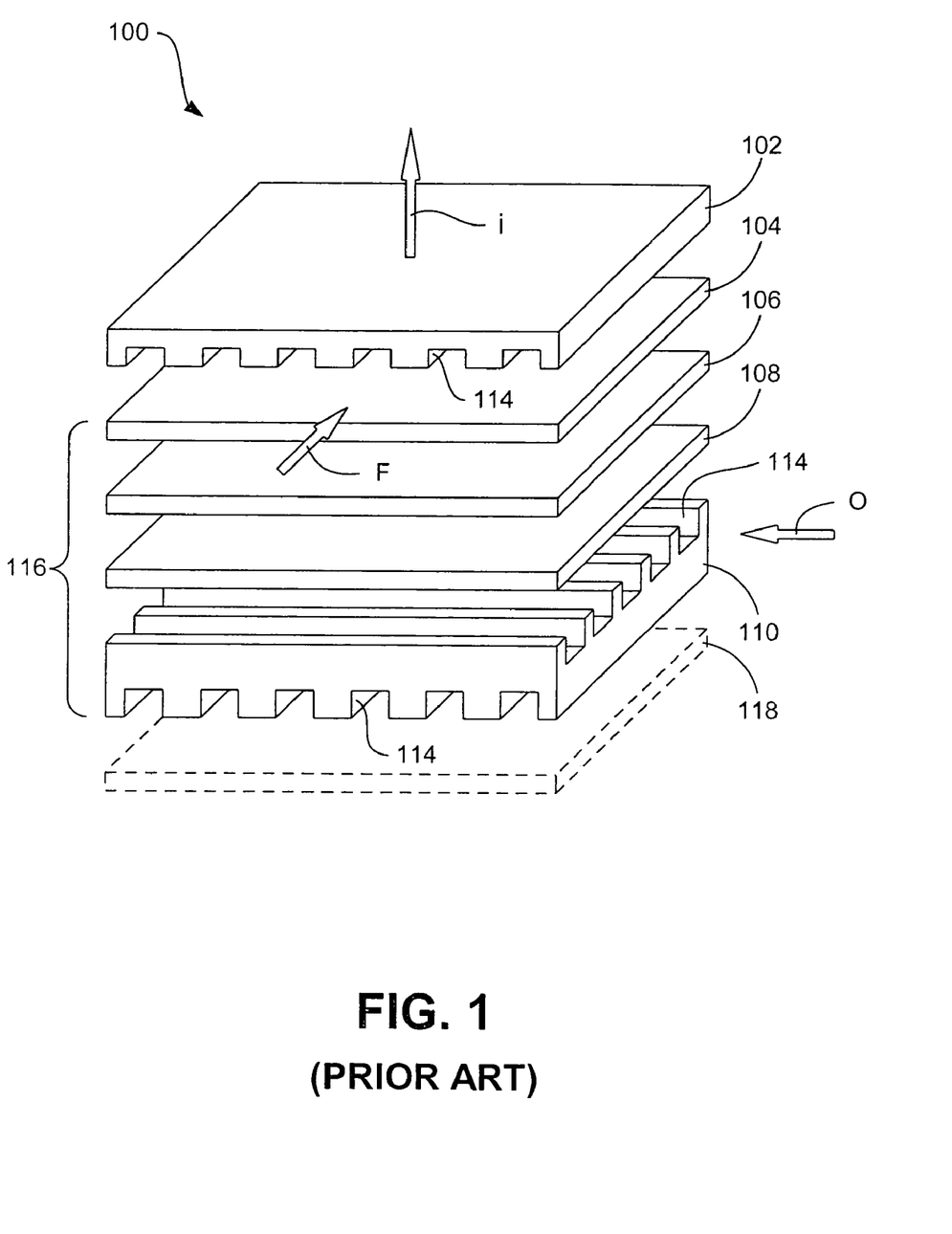
FIG. 1 is a schematic, exploded, perspective view of a solid oxide fuel cell of the prior art.

FIG. 1 illustrates an example of a known fuel cell. In particular, FIG. 1 illustrates a solid oxide fuel cell (SOFC) 100 of the prior art. As indicated in FIG. 1, the fuel cell 100 generally comprises a first interconnect layer 102, an anode 104, an electrolyte layer 106, a cathode 108, and a second interconnect layer 110. As is apparent from the figure, these various layers are stacked atop one another to form a stacked arrangement that is conventional in the art.

Each interconnect layer 102 and 110 normally is formed of an electrically conductive material (e.g., metal) and serves as both a gas flow field and a current collector. To provide the flow field functionality, the interconnect layers 102 and 110 typically are provided with channels 114 that permit reactant gas (fuel or oxidant as the case may be) to travel along the fuel cell 100. Typically, both the anode 104 and cathode 108 (i.e., the electrodes) comprises a porous material capable of diffusing reactant gas.

In use, fuel is delivered along the channels 114 of the first interconnect layer 102 (indicated by arrow "F") and oxidant is delivered along the channels 114 of the second interconnect layer 110 (indicated by arrow "O") so as to create a cross flow of reactant gas within the fuel cell 100. As the fuel travels along its channels 114, the fuel is broken down by the anode 104 into its constituent elements. Simultaneously, the oxidant is broken down by the cathode 108 to form oxygen ions. The oxygen ions are conducted through the electrolyte layer 106 and anode 104 so as to mix with the fuel and, thereby, provide electrons to the fuel. This addition of electrons causes a reaction to occur that generates inert reaction products such as water and carbon dioxide. Through this reaction, an electrochemical potential is created which can be used to generate a current flow, i, from the first interconnect layer 102 when a load (e.g., electric motor) is applied to the fuel cell 100.

Where increased voltage is required, multiple repeatable units 116 can be stacked on top of each other to multiply the voltage output. In such an instance, the second interconnect layer 110 may have a bipolar arrangement that includes a second set of channels 114 that are orthogonally transverse to the first. With such an arrangement, the stack can be continued with a further anode 118 and the other remaining layers of a further repeatable unit 116.

In view of the many advantages of fuel cells such a that shown in FIG. 1, it can be readily appreciated that fuel cells are an attractive option for powering many different types of vehicles, machinery, and equipment. Unfortunately, however, current fuel cell designs are very costly to produce. Specifically, each of the aforementioned layers must be separately fabricated. Where the interconnect layers are to have channels as identified above, the complexity of this fabrication increases, requiring intricate casting or very precise machining. Furthermore, once each of the layers is fabricated, they must be connected (e.g., bonded) to each other with great care. This manufacturing process accounts for approximately 95% of the cost current fuel cells.

Due to the high costs associated with manufacturing fuel cells, their use is not practical. Generally speaking, current fuel cell designs have costs of approximately two orders of magnitude greater than that which would be viable for use in most real-world applications. In view of the many advantages fuel cells provide, it can be appreciated that it would be desirable to a means for manufacturing fuel cells lower costs.

SUMMARY OF THE INVENTION

The present disclosure relates to hybrid monolithic fuel cells. In one embodiment, the fuel cells comprise a monolithic substrate composed of a metal material and an electrolyte material, the substrate defining a fuel channel and an oxidant channel that are separated by the electrolyte material.

The disclosure also relates to methods for manufacturing hybrid monolithic fuel cells. In one embodiment, the methods comprise preparing a metal material, preparing an electrolyte material, and forming a hybrid monolithic fuel cell substrate comprising the metal and electrolyte materials in a one-step fabrication process.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 2:
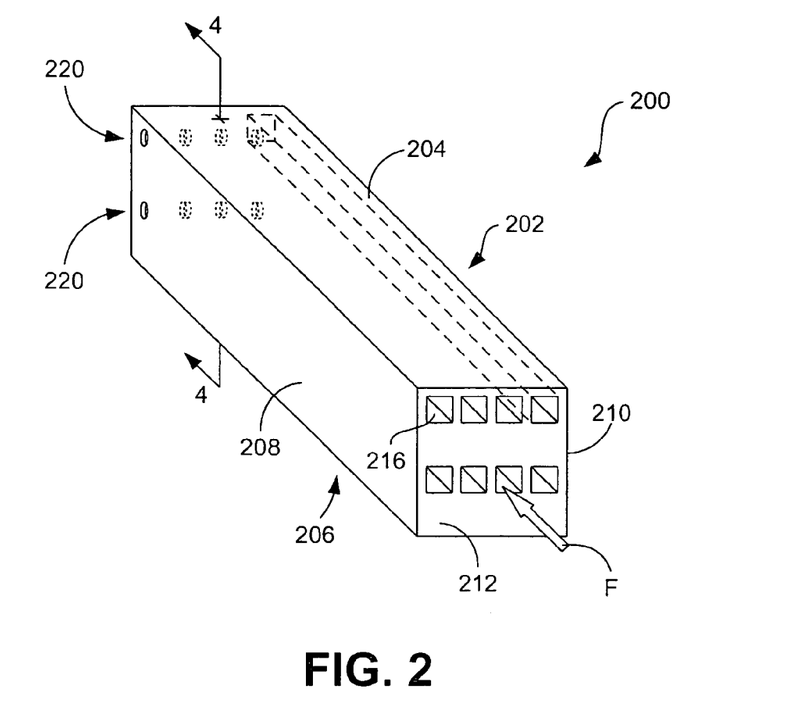
FIG. 2 is a schematic perspective view of a front end of a first example solid oxide fuel cell.
Figure 3:
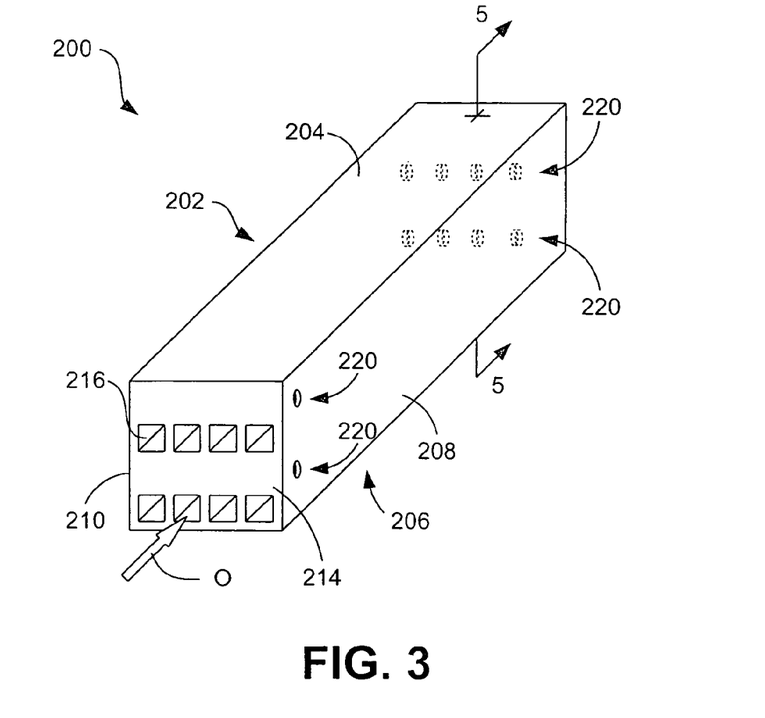
FIG. 3 is a schematic perspective view of a rear end of the example solid oxide fuel cell shown in FIG. 2.

Referring now in more detail to the drawings, in which like numerals indicate corresponding parts throughout the several views, FIGS. 2 and 3 illustrate a first example solid oxide fuel cell (SOFC) 200. As shown in these figures, the fuel cell 200 can generally comprise a honeycombed, monolithic substrate 202 that, for instance, is arranged so as to have a rectangular cross-section. Honeycombed designs, although not required, are preferred due to the strength inherent in such arrangements. Although shown as including a rectangular cross-section, persons having ordinary skill in the art will appreciate that many other geometric configurations are possible. As described in more detail below, the substrate 202 is typically formed in a one-step fabrication process such as a simultaneous extrusion process.

As indicated in FIGS. 2 and 3, the fuel cell 200 can, in some embodiments, include a top side 204, a bottom side 206, first and second lateral sides 208 and 210, a front end 212, and a rear end 214. Although absolute terms have been used to identify the aforementioned sides and ends, it is to be understood that these terms are only used to facilitate describing the fuel cell 200 and in no way are intended to limit the present disclosure. By way of example, the fuel cell 200 can have a length dimension of approximately 11 centimeters (cm) and height and width dimensions of approximately 6 millimeters (mm). Formed within the fuel cell 200 is a plurality of channels 216 that extend along the length of the cell substrate 202. As shown in the figures, these channels 216 can be rectangular in cross-section. Although shown as including rectangular channels 216, it is to be understood that many other geometric configurations are possible such as, for example, hexagonal, triangular, circular, etc. When arranged so as to have a rectangular cross-section, each channel 216 can, for instance, have a height and a width dimension of approximately 0.2 to 20 mm, and can be separated by channel walls each having a thickness dimension of approximately 0.01 to 0.40 mm.

In the embodiment shown in FIGS. 2 and 3, a 4×4 array of channels 216 is provided such that the fuel cell 200 comprises a total of sixteen different channels. As can be appreciated from FIGS. 2 and 3 when considered together, none of the channels 216 extends the entire length of the fuel cell 200 such that any one channel is open at both the front and rear ends 212 and 214 of the cell. Instead, each channel 216 typically extends nearly the entire length of the fuel cell 200 but is terminated at one end of the cell so as to form a closed, elongated channel (see hidden lines of FIG. 2). As is described below, termination can be achieved by plugging the ends of selected channels with a small piece of material such as an electrolyte material, an electrical insulator, or a metal interconnect material as long as an electron conducting path is not created around the electrolyte layer.

Figure 4:
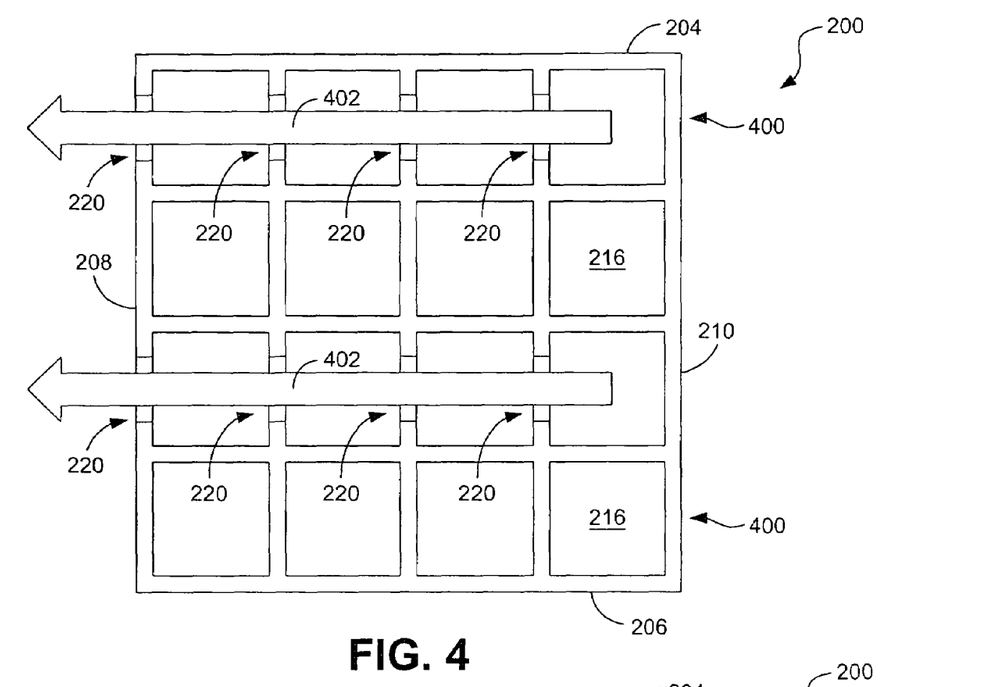
FIG. 4 is a cross-sectional view of the solid oxide fuel cell shown in FIGS. 2 and 3 taken along line 4—4 (FIG. 2).
Figure 5:
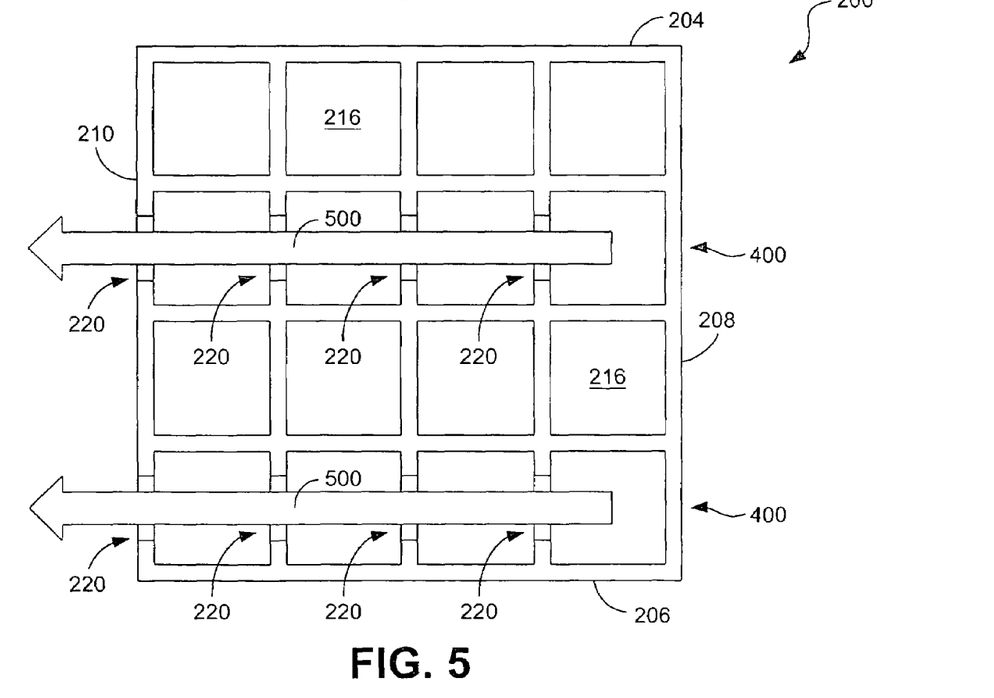
FIG. 5 is a cross-sectional view of the solid oxide fuel cell shown in FIGS. 2 and 3 taken along line 5—5 (FIG. 3).

Formed in the lateral sides 208 and 210 of the substrate 202 are openings 220 that provide access to the internal channels 216 of the substrate. Typically, openings 220 are formed such that access can be gained to an entire row of channels 216. This arrangement is illustrated most clearly in FIGS. 4 and 5 which pertain to line 4—4 of FIG. 2 and line 5—5 of FIG. 3, respectively. With such an arrangement, reactant gases that enter the fuel cell 200 from the ends 212 and 214 of the fuel cell along any given row 400, as well as reaction products formed during operation of the cell, can be output via the openings 220 in the manner illustrated by the arrows 402 and 500. Specifically, where fuel, F, (e.g., hydrogen, methane, or other hydrocarbon fuel) is introduced into the channels 216 accessible through the front end 212 of the cell 200, the fuel and/or reaction products can be exhausted along the paths of arrows 402. Similarly, where oxidant, O, (e.g., oxygen or air) is introduced into the channels 216 accessible from the rear end 214 of the cell 200, the oxidant and/or reaction products can be exhausted along the paths of arrows 500.

As is described in greater detail below, the monolithic substrate 202 comprises at least a metal material and an electrolyte material in an alternating pattern. More particularly, the substrate 202 comprises alternating metal interconnects and electrolyte layers that facilitate the reactions which result in the generation of electrical energy. Accordingly, the substrate 202 can be said to have a hybrid, yet monolithic, configuration in which two different materials are present in a single, unitarily-formed article. As is also discussed below, this structure and, more specifically, the manufacturing process used to create this structure, greatly simplifies the manufacturing process and, thereby, greatly reduces the cost of the fuel cell 200.

Figure 15:
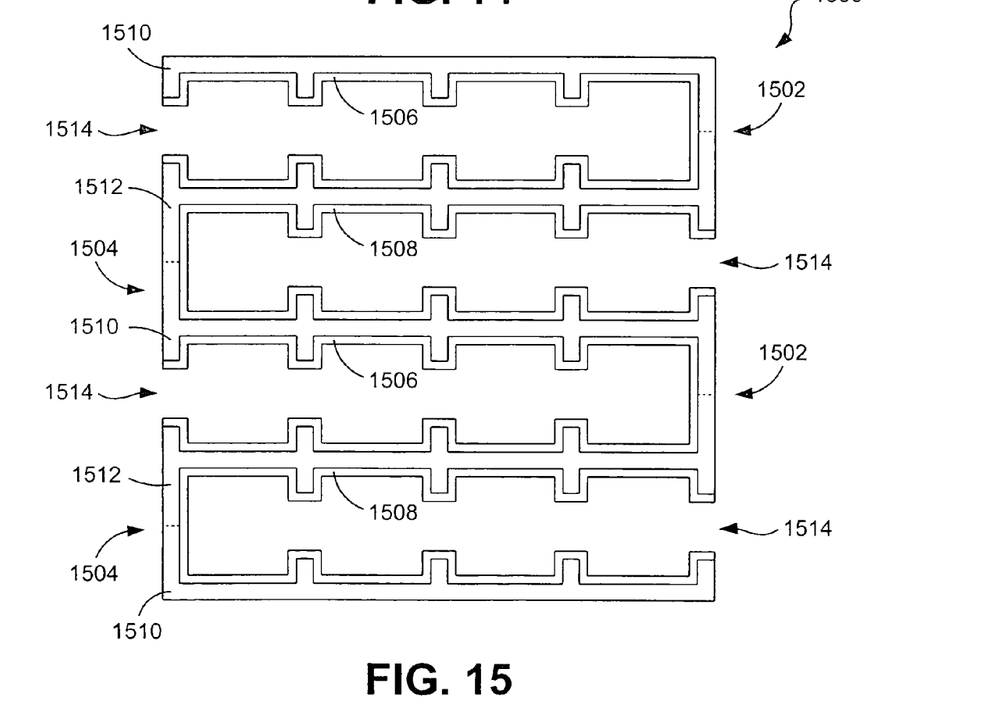
FIG. 15 is a schematic end view of the fuel cell substrate of FIG. 14 after manifolding and the application of electrode layers.

Although not visible in FIGS. 2–5, the various rows 400 of channels 216 of the fuel cell substrate 202 are alternately coated with layers of anode material and layers of cathode material to facilitate diffusion of the reactant gases supplied to the fuel cell 200. The provision of these layers is described in greater detail below with reference to FIGS. 8–9 and example layers are illustrated in FIG. 15.

Figure 6:
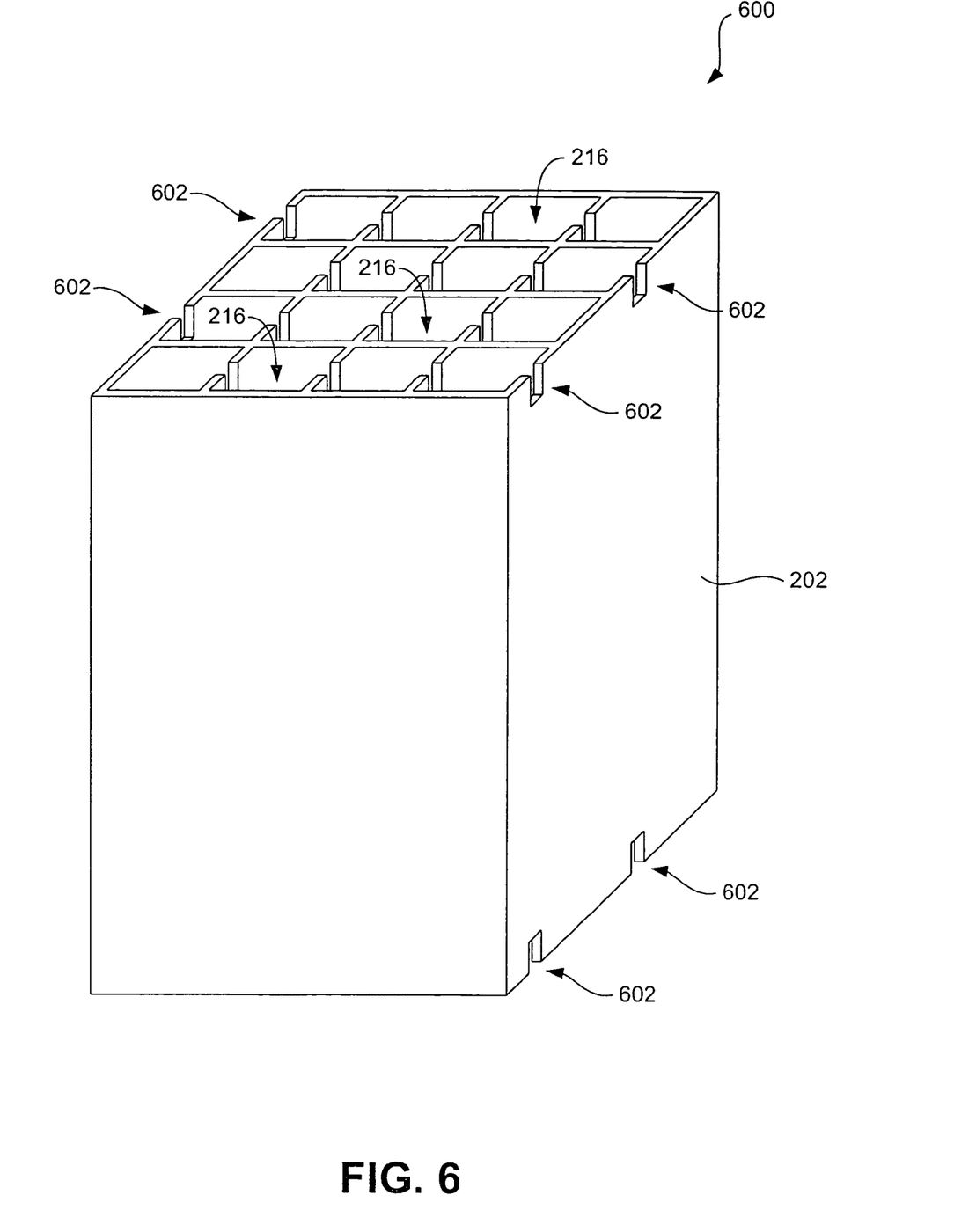
FIG. 6 is a schematic perspective view of second example fuel cell.
Figure 7:
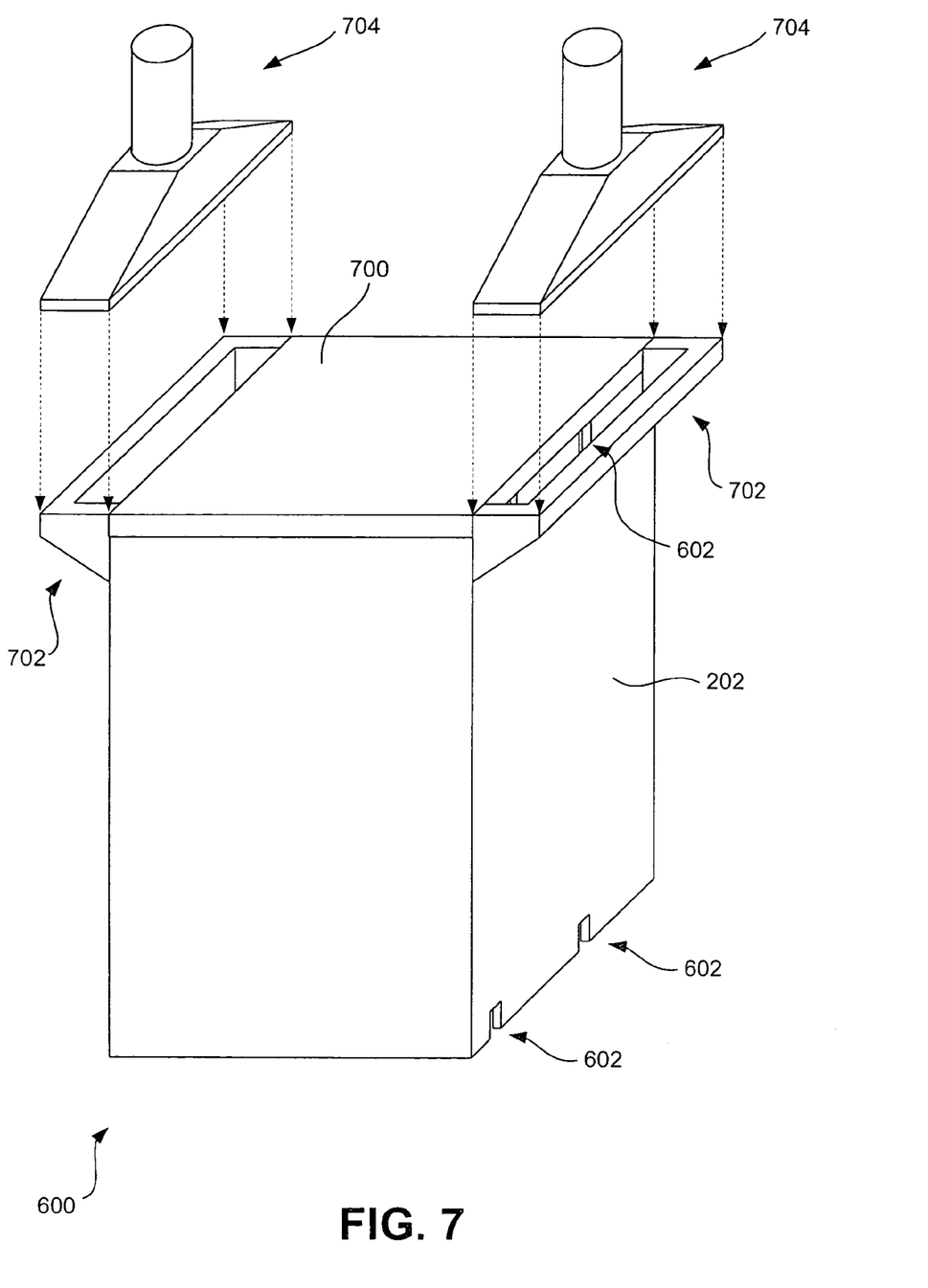
FIG. 7 is a schematic perspective view of the example fuel cell shown in FIG. 6 including gas delivery means.

FIGS. 6 and 7 illustrate a second example solid oxide fuel cell 600. This fuel cell 600 is similar to that shown in FIGS. 2–5 and therefore includes a substrate 202 having a plurality of channels 216. However, the fuel cell 600 transports reactant gas differently from the fuel cell 200. Contrary to the fuel cell 200, the channels 216 of the fuel cell 600 extend along the entire length of the cell and therefore are open at both ends of the cell. In addition, as indicated in FIG. 6, the fuel cell 600 is provided with a plurality of transverse grooves 602 at both ends of the cell substrate 202 instead of openings 220. By way of example, these grooves 602 can be formed by machining the substrate 202 with an appropriate blade (not shown). Similar to the openings 202, these grooves 602 provide access to the channels 216 such that reactant gas and/or reaction products can pass into and out of the fuel cell 600. As indicated in FIG. 6, these grooves 602 extend from one side of the fuel cell 600, but stop short of extending through to the other side of the cell. This arrangement facilitates segregation of the reactant gases fed to the fuel cell 600 during operation.

With reference to FIG. 7, once the grooves 602 have been formed, the substrate 600 can be provided with end plates 700 (only one shown in FIG. 7) that hermetically seal the ends of the substrate 202. Once these plates 700 are in place, access to the channels 216 can only be obtained via the grooves 602. Next, both ends of the fuel cell 600 can be provided with side vents 702 and delivery structures 704 that can be used to direct reactant gas and/or reaction products to and from the fuel cell. These side vents 702 and delivery structures 704 are provided at both ends of the fuel cell 600. With such an arrangement, reactant gases can flow into the fuel cell 600 through opposed delivery structures 704 at one end of the cell, pass through the channels 216 of the cell, and then exit the cell through the side vents and delivery structures provided at the other end of the cell.

Figure 8:
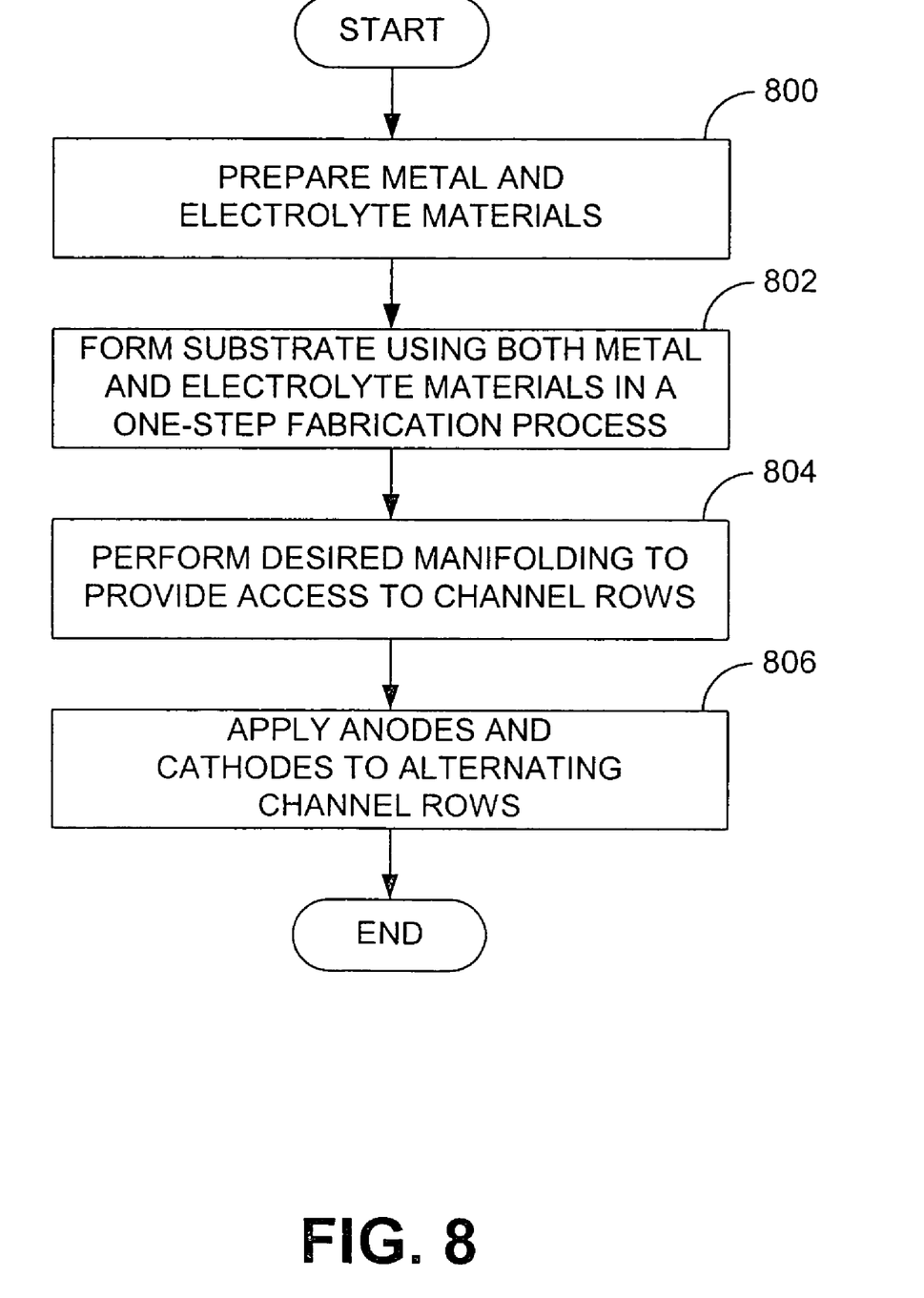
FIG. 8 is a flow diagram describing a first manufacturing process for fuel cells.

FIG. 8 provides a flow diagram of a general method that can be used to manufacture either of the fuel cells described above, as well as any other hybrid monolithic fuel cell. Beginning with block 800 of FIG. 8, separate metal and electrolyte materials are prepared. By way of example, these materials can be in the form of slurries, pastes, or powders, depending upon the substrate formation technique that is to be used.

Once the various metal and electrolyte materials have been prepared, a substrate, such as substrate 202 shown in FIGS. 2–7, is formed using both the metal and electrolyte materials in a one-step fabrication process, as indicated in block 802. As described below in greater detail, the metal and electrolyte materials are used in the fabrication of the substrate so as to simultaneously form alternating metal interconnect and electrolyte layers. By way of example, the one-step fabrication process can comprise an extrusion process, a casting process, an injection molding process, a dry pressing process, or other such process in which two separate materials can be simultaneously used to form a hybrid monolithic article.

Next, with reference to block 804, the desired manifolding is performed on the formed substrate to permit the flow of gas to or from the channels of the substrate. As indicated in the example embodiments described above, this manifolding can, for instance, comprise providing openings through the side of the substrate and the various channel walls or providing grooves that bridge the channels of particular channel rows.

In any case, electroding can then be performed so as to provide anodes and cathodes in the channels of alternating rows of the substrate, as indicated in block 806, so as to complete the solid oxide fuel cell. As will be appreciated by persons having ordinary skill in the art, the simultaneous formation of the metal and electrolyte portions during fabrication of the fuel cell substrate, as well as the simultaneous formation of all channels, greatly simplifies the manufacturing process for the fuel cell. Indeed, the process is simplified to the extent that the fuel cells can be manufactured for a cost that is approximately two orders of magnitude of that required for manufacturing conventional stacked fuel cells such as that indicated in FIG. 1.

Figure 9:
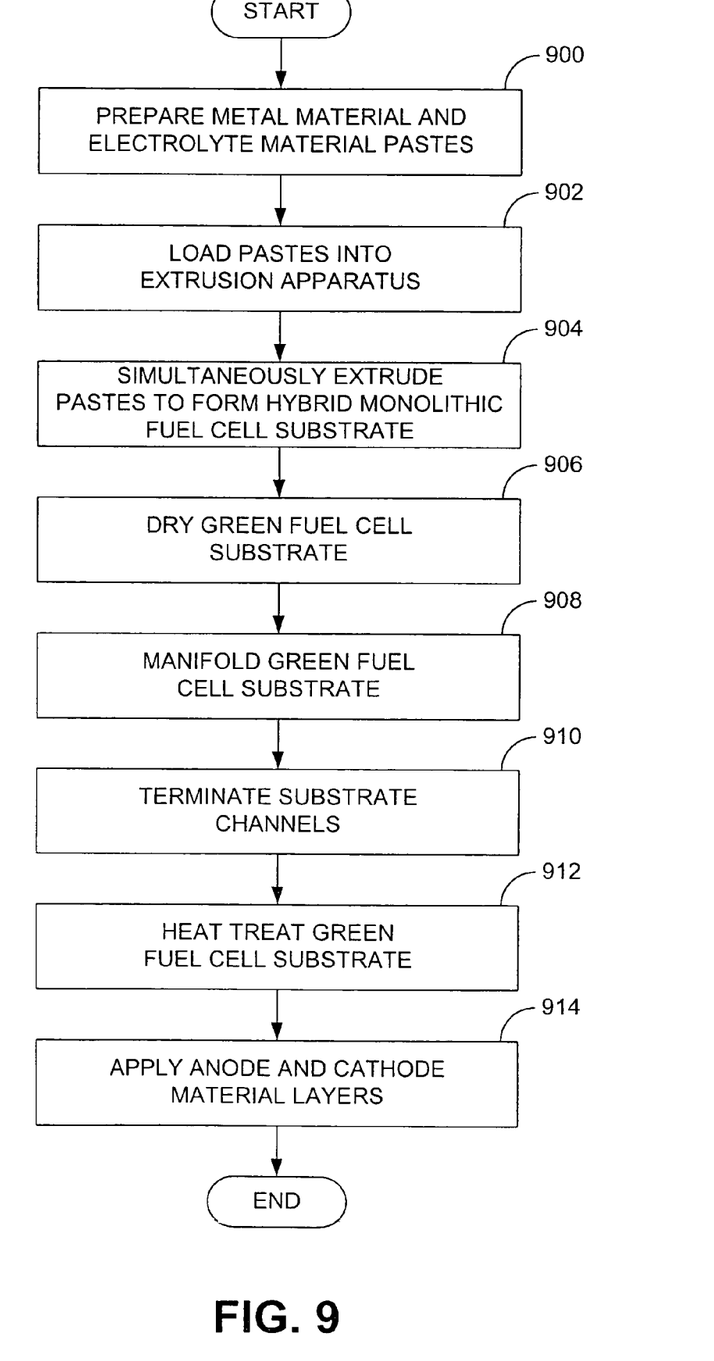
FIG. 9 is a flow diagram describing a second manufacturing process for fuel cells.

FIG. 9 provides a more detailed example of a manufacturing process for a fuel cell. In particular, FIG. 9 describes the fabrication of a fuel cell using a simultaneous extrusion process. Beginning with block 900, metal material and electrolyte material pastes are separately prepared. The metal material paste can comprise a metal oxide powder that includes an oxide of iron, nickel, cobalt, chromium, copper, molybdenum, niobium, manganese, tungsten, combinations thereof, or other appropriate metals. Of these, nickel and cobalt are desirable in that they enhance metal to electrolyte interfacial electrochemical bonding. In addition, chromium and niobium are desirable in that they are difficult to reduce and therefore impart oxidation resistance and chemical stability. In some situations, it may be appropriate to include decomposing metal compounds in the metal material paste such as hydrides such as titanium and zirconium. The use of metal oxides in forming pastes is described in detail in U.S. patent application Ser. No. 09/591,160 filed Jun. 9, 2000, which is hereby incorporated by reference in its entirety into the present disclosure. Alternatively, the metal material paste can comprise a powder of the metal phase of the aforementioned metal oxides or powders of precious metals such as platinum The metal or metal oxide powder typically is mixed with water and various additives (e.g., binders) to form a paste of appropriate consistency for effective extrusion.

In similar manner, the electrolyte paste is formed by mixing an electrolyte powder with water and various additives (e.g., binders). Normally, the electrolyte powder comprises a ceramic electrolyte powder that has rheological properties similar to those of the chosen metal material paste to facilitate even extrusion of the pastes, as well as thermal properties that are similar to those of the selected metal material paste such that the pastes shrink at nearly the same rates during the fabrication process and expand at nearly the same rates during operation to avoid warping or cracking of the formed fuel cell. By way of example, the electrolyte powder can comprise yttria-stabilized zirconium (YSZ), scandium-stabilized zirconium (SSZ), cerium oxide doped with gadolinium (GDC) or samarium (SDC), combinations thereof, or other appropriate electrolyte materials. Of these, ceria-based materials are preferred in they have high oxygen ion conductivity at lower temperatures (e.g., approximately 400° C. to 600° C.) so that the fuel cell can be operated at relatively low temperatures, thereby permitting the use of non-precious metals in the construction of the metal interconnects.

Figure 10:
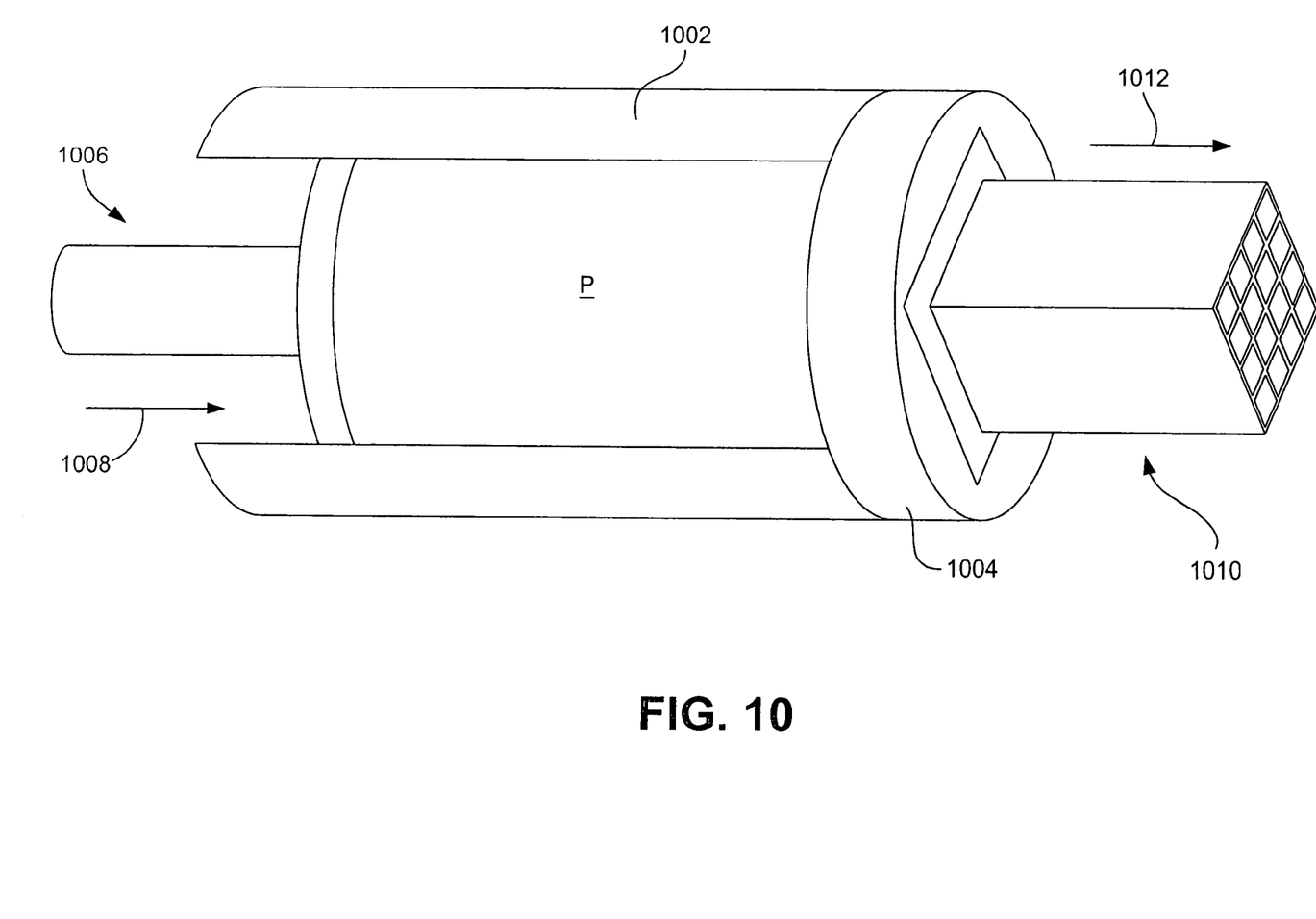
FIG. 10 is a perspective view of an extrusion apparatus that can be used to in the manufacturing processes described in FIGS. 8 and 9.
Figure 11:
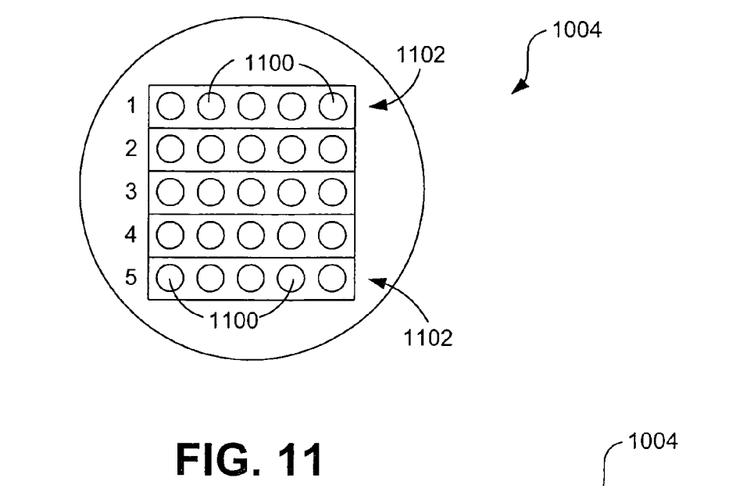
FIG. 11 is a input end view of a die of the extrusion apparatus shown in FIG. 10.
Figure 12:
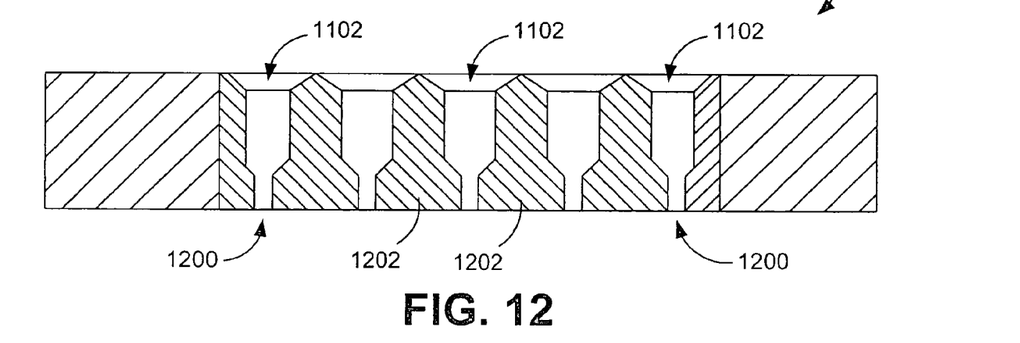
FIG. 12 is a cross-sectional view of the die shown in FIG. 11.
Figure 13:
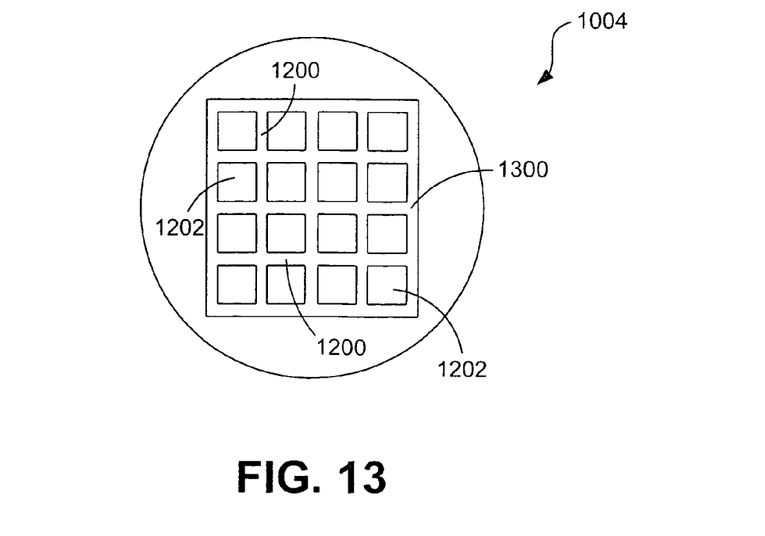
FIG. 13 is an output end view of the die shown in FIGS. 11 and 12.

Once the metal or metal oxide and the electrolyte pastes have been prepared, they are loaded into an appropriate extrusion apparatus, as indicated in block 902. An example of one such extrusion apparatus 1000 is illustrated in FIG. 10. As indicated in this figure, the extrusion apparatus 1000 can generally comprise a barrel 1002 that houses a die 1004. The pastes, P, are loaded into the barrel 1002 in a manner such that they are segregated from each other and are then forced through the die 1004 using a ram 1006 that moves in the direction indicated by arrow 1008. An example die 1004 is illustrated in FIGS. 11–13. As shown in FIG. 11, the input end of the die 1004 can be provided with a plurality of openings 1100 that are adapted to receive pastes. These openings 1100 can be arranged in rows 1102 that alternately receive metal (or metal oxide) and electrolyte pastes. By way of example, the rows 1, 3, and 5 can be provided with metal or metal oxide paste and rows 2 and 4 can be provided with electrolyte paste.

Figure 14:
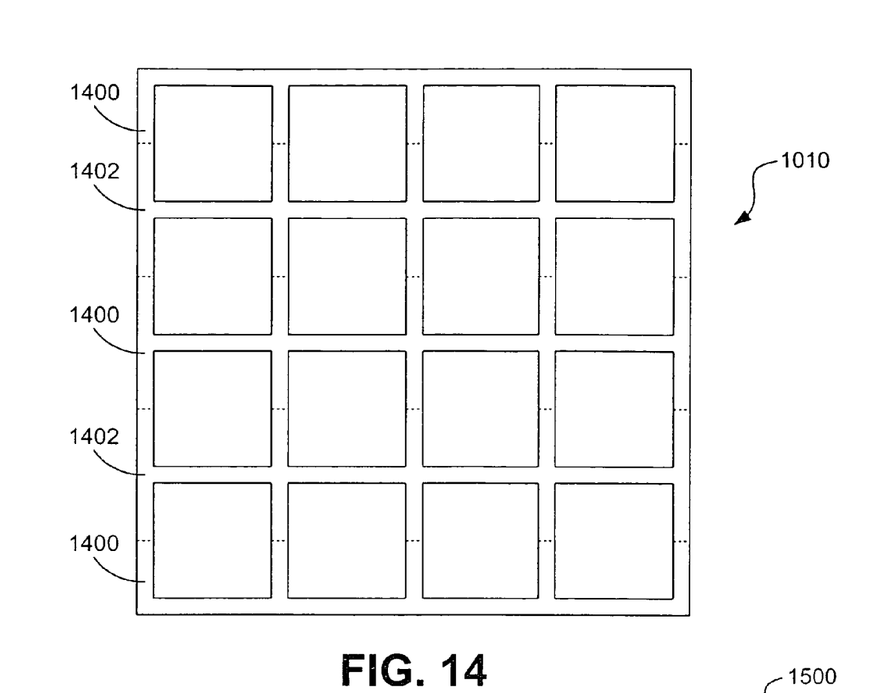
FIG. 14 is an end view of a fuel cell substrate that can be produced using the manufacturing processes of FIGS. 8 and 9.

Once forced through the openings 1102, the pastes pass through the body of the die 1004 and are forced through narrow gaps 1200 (FIG. 12) that are formed with die lands 1202 so as to extrude the substrate (block 904). As indicated in FIG. 13, these gaps 1200 form a continuous lattice 1300 through which various substrate sides and channel walls can be formed and, with reference back to FIG. 10, a green substrate 1010 can be formed in the direction of arrow 1012. FIG. 14 illustrates the hybrid configuration of the green substrate 1010 after formation in the manner described above. As indicated in FIG. 14, the simultaneous extrusion of the metal or metal oxide and electrolyte pastes results in an alternating pattern of metal or metal oxide portions 1400 (i.e., metal interconnects) and electrolyte portions 1402 (i.e., electrode layers).

With reference back to FIG. 9, the manufacturing process continues with drying of the green substrate 1010, as indicated in block 906. Normally, this drying comprises air drying the green substrate 1010 at ambient temperature. Next, the green substrate 1010 can be manifolded, as indicated in block 908. Where the fuel cell is to be configured as shown in FIGS. 2–5, this manifolding can comprise forming openings 220 through the substrate sides and channel walls using, for example, a drilling process. Alternatively, where the fuel cell is to be configured as that shown in FIGS. 6 and 7, manifolding can comprise machining transverse grooves 602 across rows of channels 216.

Once manifolding has been performed, various substrate channels 216 can be terminated, as identified in block 910. Where the fuel cell is to have a configuration similar to that shown in FIGS. 2–5, the channels 216 of alternating rows of the green substrate 1010 can be terminated in the manner shown in FIGS. 2 and 3 by, for instance, plugging the channels at the ends of the substrate with one or more of the paste materials used to form the substrate. Where the fuel cell is to have a configuration similar to that shown in FIGS. 6 and 7, termination can comprise applying end plates 700 to both ends of the green substrate 1010. In such a case, appropriate gas delivery means normally will be required such as, for example, the side vents 702 and the delivery structures 704 shown in FIG. 7.

Next, the substrate 1010 can be heat treated, as indicated in block 912, to sinter the electrolyte material so as to harden and densify the substrate and form a hermetic structure. By way of example, this heat treating can be conducted at a temperature approximately between 1100° C. and 1450° C. This heating results in a strong bond between the materials used to form the substrate. If a metal oxide paste was used to form the substrate, a direct reduction can be simultaneously, or separately, performed on the substrate to convert the metal oxide(s) to a metal phase. This reduction can be achieved by immersing the substrate in a bath of an appropriate reducing agent such as, for instance, hydrogen gas or carbon monoxide gas at a temperature of approximately between 400° C. and 1450° C.

At this point, anode and cathode materials can be applied to the substrate, as indicated in block 914. Example anode materials include mixtures of nickel and YSZ, SSZ, GDC, or SDC, depending upon the electrolyte material used. Example cathode materials include mixtures of $Sm_{0.5}Sr_{0.5}CoO_3$ (SSC) and YSZ, SSZ, GDC, or SDC, depending upon the electrolyte material used. The anode and cathode materials can be applied, for instance, using a slurry deposition process. Where the fuel cell is similar to that shown in FIGS. 2–5, these materials can be applied by dipping a first end (e.g., the front end 212 in FIG. 2) of the substrate in a anode material slurry and then dipping a second end (e.g., the rear end 214 in FIG. 3) of the substrate in a cathode material. Due to the termination of the alternating rows of channels, this manner of dipping will yield alternating rows of anode-coated channels and cathode-coated channels.

Where the fuel cell is similar to that shown in FIGS. 6 and 7, the anode and cathode materials can be applied by passing them through the channels of the fuel cell using the provided gas delivery means (e.g., delivery structures 704 and side vents 702). Once the layers of electrode materials have been deposited, they can be sintered by again heat treating the substrate. Although a slurry deposition process has been described, persons having ordinary skill in the art will appreciate that alternative application methods can be used with equally acceptable results including, for example, solution, sol gel, or precipitation deposition. In addition, although the electrode materials have been described as being applied after heat treating the substrate, it is to be understood that these materials could be applied to the green substrate such that only one heat treating step is necessary.

When the manufacturing process described above is used, a completed hybrid monolithic fuel cell results. FIG. 15 illustrates the internal composition of such a fuel cell 1500 in detail. As identified in this figure, the fuel cell 1500 comprises alternating fuel carrying rows 1502 and oxidant carrying rows 1504 of channels. The channels of the fuel-carrying rows 1502 of the cell 1500 are coated with a layer of anode material 1506, while the oxidant-carrying rows 1504 of the cell are coated with a layer of cathode material 1508. In addition, as identified above with reference to FIG. 14, the cell 1500 comprises alternating metal portions 1510 (i.e., metal interconnects) and electrolyte portions 1512 (i.e., electrolyte layers). In a preferred arrangement, the cell 1500 is configured such that metal portions 1510 terminate the top and bottom sides of the fuel cell 1500 to facilitate current collection and electrical connection to the cell. As is further indicated in FIG. 15, the fuel cell 1500 comprises passages 1514 (indicated schematically in FIG. 15) through which reactant gas and/or reaction products can pass out from, or into the cell channels.

With the arrangement described above in relation to FIG. 15, fuel (e.g., hydrogen, methane, or other hydrocarbon fuel) can be directed into the channels of the fuel-carrying rows 1502 and oxidant (e.g., oxygen or air) can be directed into the channels of the oxidant-carrying rows 1504. As the fuel and oxidant flow along their respective channels they are broken down by the anode material 1506 and the cathode material 1508, respectively. As the oxidant is broken down, oxygen ions are formed and are conducted through the electrolyte material of the electrolyte portions 1512 so as to electrochemically react with the fuel and thereby generate a flow of electrons that can be collected by the metal portions 1510 and used to provide power.

Figure 16:
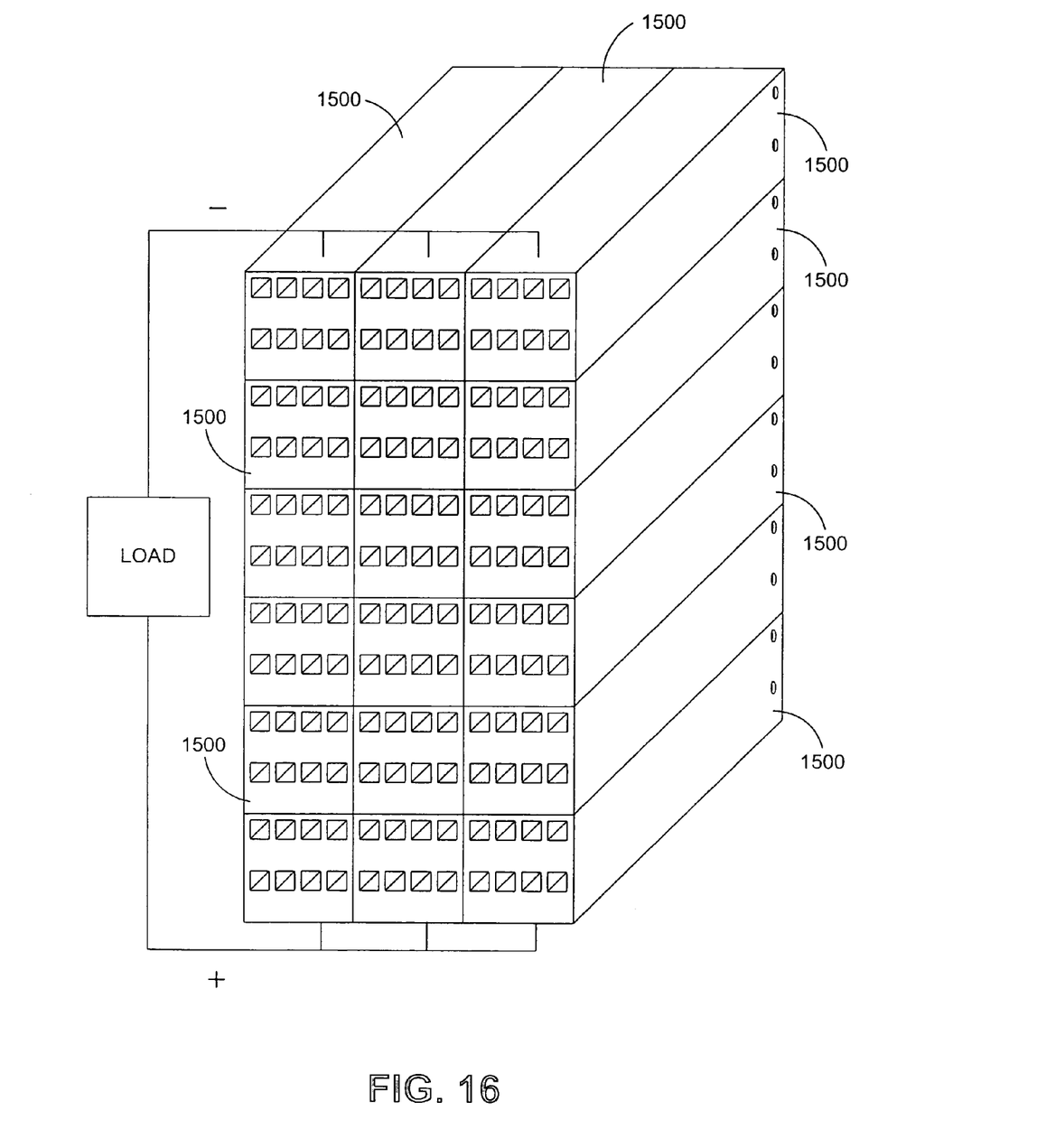
FIG. 16 is a perspective view of a plurality of fuel cells connected in series and parallel so as to yield increased voltage and current.

Due to the alternating layer arrangement of the hybrid monolithic fuel cell 1500, the fuel cells can be connected in series to increase the voltage output by stacking the fuel cells on top of each other as shown in FIG. 16. Electrical connection is facilitated where the top and bottom sides of each fuel cell 1500 comprises a metal interconnect. In addition, the current output can be increased by connecting multiple fuel cells 1500 in series in the manner shown in FIG. 16. Therefore, multiple fuel cells 1500 can be used to satisfy the power needs of substantially any application.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A fuel cell, comprising:
    a monolithic substrate including alternating metal interconnect and electrolyte layers, the metal interconnect and electrolytic layers together forming an array of channels, wherein the channels extend a length direction of the substrate;
    a layer of anode material provided within a first row of the array of channels;
    a layer of cathode material provided within a second row of the array of channels;
    a first transverse groove formed through at least one lateral side of the substrate and at least one interior wall of the first row of the array of channels to provide fluid access to the first row of channels; and
    a second transverse groove formed through at least one lateral side of the substrate and at least one interior wall of the second row of the array of channels to provide fluid access to the second row of channels.

2. The fuel cell of claim 1, wherein:
    the channels of the first row of the array are adapted to receive a fuel;
    the channels of the second row of the array are adapted to receive an oxidant;
    the first transverse groove is adapted to exhaust from the channels of the first row of the array at least one of the fuel and a reaction product; and
    the second transverse groove is adapted to exhaust from the channels of the second row of the array at least one of the oxidant and the reaction product.

3. The fuel cell of claim 1, wherein the monolithic substrate includes a metal material and an electrolyte material, the metal and electrolyte materials having similar rheological and thermal properties such that the fuel cell is relatively even and expands and shrinks relatively uniformly.

4. The fuel cell of claim 3, wherein the metal material includes at least one of iron, nickel, cobalt, chromium, copper, molybdenum, niobium, manganese, and tungsten.

5. The fuel cell of claim 3, wherein the electrolyte material includes at least one of yttria-stabilized zirconium, scandium-stabilized zirconium, or cerium oxide doped with gadolinium or samarium.

6. The fuel cell of claim 1, wherein the layer of anode material comprises a mixture of nickel and at least one of yttria-stabilized zirconium, scandium-stabilized zirconium, cerium oxide doped with gadolinium or samarium, and the layer of cathode material comprises a mixture of $Sm_{0.5}Sr_{0.5}CoO_3$ and at least one of yttria-stabilized zirconium, scandium-stabilized zirconium, cerium oxide doped with gadolinium or samarium.

7. The fuel cell of claim 1, wherein the materials used to form the substrate are sintered together, and the layer of anode material and the layer of cathode material are sintered to the substrate.

8. The fuel cell of claim 1, wherein each channel has a height and a width of about 0.2 mm to 20 mm, and the channels are separated by channel walls having a thickness of about 0.01 mm to 0.40 mm.

9. The fuel cell of claim 1, wherein the channels of the array extend through a front and a rear end of the fuel cell, and wherein the fuel cell further comprises end plates that hermetically seal both ends of the fuel cell.

10. The fuel cell of claim 9, further comprising a first side vent and a first delivery structure at the front end of the fuel cell, and a second side vent and a second delivery structure at the rear end of the fuel cell, such that reactant gases can flow into the fuel cell through the first side vent and first delivery structure, pass through the channels of the cell, and exit the cell through the second side vent and second delivery structure.

11. The fuel cell of claim 1, wherein the channels of the first row of the array extend through a front end of the fuel cell but do not extend through a rear end of the fuel cell, and the channels of the second row of the array extend through the rear end of the fuel cell but do not extend through the front end of the fuel cell.

12. The fuel cell of claim 11, wherein the channels of the first row of the array are capped at the rear end of the substrate and the channels of the second row of the array are capped at the front end of the substrate.

13. The fuel cell of claim 12, wherein the channels of the array are plugged with a material that is at least one of an electrolyte material, an electrical insulator, or a metal interconnector material that does not create an electron conducting path around the electrolyte layer.

14. A fuel cell comprising:
    a substrate formed from alternating metal interconnect and electrolyte layers, the substrate having first and second rows of channels, each channel extending an entire length of the substrate such that open ends of the channels are formed through a front face and a rear face of the substrate;
    a plurality of first transverse grooves that provide the channels of the first row with access to an exterior of the substrate, the first transverse grooves being formed through one lateral side of the substrate and through interior channels walls between the channels of the first row;
    a plurality of second transverse grooves that provide the channels of the second row with access to the exterior of the substrate, the second transverse grooves being formed through one lateral side of the substrate and through interior channels walls between the channels of the second row;
    a layer of anode material coating the channels of the first row and the first transverse grooves between the channels of the first row; and
    a layer of cathode material coating the channels of the second row and the second transverse grooves between the channels of the second row.

15. The fuel cell of claim 14, wherein:
    the first transverse grooves are machined along the faces of the substrate, a front first transverse groove being machined through the front face of the substrate such that the groove connects the open ends of the channels of the first row along the front face of the substrate, and a rear first transverse groove being machined through the rear face of the substrate such that the groove connects the open ends of the channels of the first row along the rear face of the substrate; and the second transverse grooves are machined along the faces of the substrate, a front second transverse groove being machined through the front face of the substrate such that the groove connects the open ends of the channels of the second row along the front face of the substrate, and a rear second transverse groove being machined through the rear face of the substrate such that the groove connects the open ends of the channels of the second row along the rear face of the substrate.

16. The fuel cell of claim 15, further comprising:

a front end plate that hermetically seals the front face of the substrate;

a rear end plate that hermetically seals the rear face of the substrate;

a front first side vent and delivery structure in fluidic communication with the front first transverse groove;

a rear first side vent and delivery structure in fluidic communication with the rear first transverse groove;

a front second side vent and delivery structure in fluidic communication with the front second transverse groove; and a rear second side vent and delivery structure in fluidic communication with the rear second transverse groove; such that fuel entering the front first side vent and delivery structure passes through the front first transverse groove, along the first row of channels, through the rear first transverse groove, and out of the rear first side vent and delivery structure, and oxidant entering the rear second side vent and delivery structure passes through the rear second transverse groove, along the second row of channels, through the front second transverse groove, and out of the front second side vent and delivery structure.

* * * * *